(No Model.)

W. W. CLEAVELAND.
MILLSTONE DRESSING MACHINE.

No. 253,511. Patented Feb. 14, 1882.

Witnesses.
F. L. Ouraud
L. L. Miller

Inventor
W. W. Cleaveland
per
Chas. H. Fowler,
Attorney

UNITED STATES PATENT OFFICE.

WALLACE W. CLEAVELAND, OF MARSHALL, MICHIGAN.

MILLSTONE-DRESSING MACHINE.

SPECIFICATION forming part of Letters Patent No. 253,511, dated February 14, 1882.

Application filed December 15, 1881. (No model.)

*To all whom it may concern:*

Be it known that I, WALLACE W. CLEAVELAND, a citizen of the United States, residing at Marshall, in the county of Calhoun and State of Michigan, have invented certain new and useful Improvements in Millstone-Dressing Machines; and I do hereby declare that the following is a full, clear, and exact description of the same, reference being had to the annexed drawings, making a part of this specification, and to the letters and figures of reference marked thereon.

Figure 1:
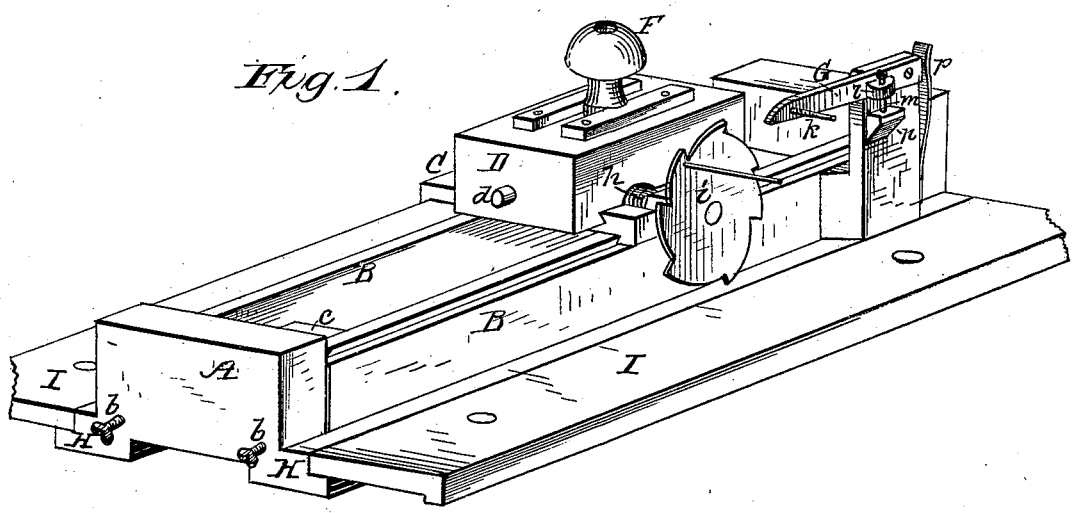
Figure 2:
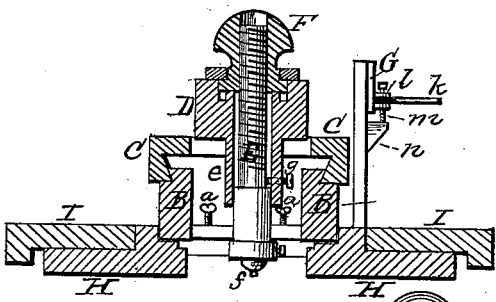
Figure 3:
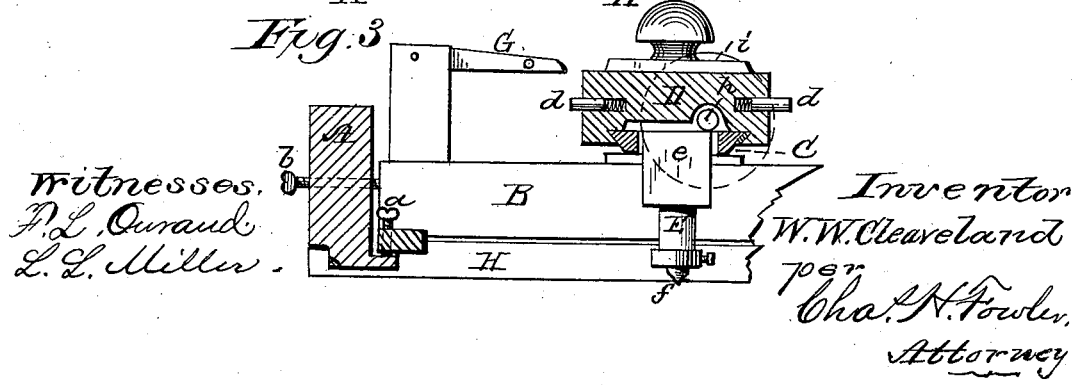

Figure 1 of the drawings is a perspective view of my invention. Fig. 2 is a cross-section thereof; and Fig. 3, a side elevation, partly in section.

The present invention has relation to certain new and useful improvements in diamond millstone-dressing machines; and the object thereof is to improve the construction of said machines, whereby they will operate more effectively and with better results upon the millstone in dressing the same. These objects I attain by the construction and mechanism, substantially as shown in the drawings and hereinafter described.

In the accompanying drawings, A represents the frame, of rectangular form, which, if desired, may be provided with suitable handles for convenience of placing it on the millstone or removing it therefrom.

Within the frame A are located tracks or ways B, adapted to be adjusted vertically and lengthwise by set-screws $a$ and set-screws $b$, the latter passing horizontally through the ends of the frame A, while the former pass vertically through cross-pieces $c$, which connect the ends of the tracks or ways B together. This construction will not only admit of the tracks or ways B being adjusted in height and horizontally with relation to the frame A, but tilted to any required angle, as found necessary, and firmly held in such inclined position.

Upon the tracks or ways B is mounted a bed, C, adapted to move horizontally thereon in a direction of its length, and upon this bed is mounted a carriage, D, which moves at right angles to that of the bed. The ways or tracks B, bed C, and carriage D are all secured together by dovetail connections to hold them firmly in place.

The carriage D, at its ends, is provided with suitable spring-buffers, $d$, to lessen the concussion or shock caused by the carriage coming in contact with the ends of the frame A. The carriage D has a depending sleeve, $e$, through which passes a screw-threaded rod, E, the lower end of said rod carrying the diamond $f$.

To the upper end of the rod E is connected a handle, F, having a screw-threaded opening through it for the screw-threads upon the rod E to engage, thereby enabling the rod to be either raised or lowered, as circumstances may require, by turning the handle in the proper direction.

In order to prevent the rod E turning upon its own axis when the handle F is being turned, the rod has a groove running parallel with its axis, into which projects a pin, $g$, said pin passing through the sleeve $e$.

The carriage D is moved in a direction transverse to the frame A over the bed C by a screw-rod, $h$. This screw-rod is connected to the carriage in the ordinary manner, and operates the same as those commonly used in this class of machines, and has secured to its outer end a toothed wheel, $i$.

To one end of the frame A, and to the side thereof, is pivoted an arm, G, carrying a pin, $k$, this pin engaging with the teeth upon the wheel when the latter is brought in contact therewith, and causing the wheel to turn, which also turns the adjusting-screw $h$ and causes the carriage D to be moved a certain distance.

The pivoted arm G has upon its side a lug, $l$, through which passes a set-screw, $m$, the lower end of which bears upon a stop, $n$, of the frame A, and a spring, $p$, presses against the rear end of the pivoted arm G and allows it to yield sufficiently when the teeth of the wheel $i$ are brought in contact with the pin $k$, at the same time holding it sufficiently rigid to insure the pin $k$ forcing the wheel around the required distance.

By the employment of the set-screw $m$, in connection with the pivoting of the arm G, the height or angle of the arm may be regulated, which will govern the extent to which the wheel will be turned, as one or more teeth may be caught by the pin $k$ to feed fast or slow across the furrow or land.

The frame A is formed upon each side with a support, H, for connecting thereto weights I. These weights are detachably secured to the supports, so that they can be readily and conveniently removed when it is found necessary to remove the machine from the stone.

It should be noticed that the weights I do not rest upon the stone, but are held from contact therewith by the supports H, said weights being connected to the supports in any suitable manner that will admit of their removal, the object of the weights being to steady the machine while on the stone, and thereby insure a more perfect dressing thereof.

Having now fully described my invention, what I claim as new, and desire to secure by Letters Patent, is—

1. In a millstone-dressing machine, the frame A and adjustable tracks or ways B, in combination with the bed C, carriage D, screw-rod E, carrying diamond $f$, and handle F, for adjusting the height of the screw-rod, said carriage having suitable spring-buffers, $d$, connected thereto, substantially as and for the purpose set forth.

2. In a millstone-dressing machine, the combination, with the movable bed C, carriage D, screw-rod E, screw-handle F, adjusting-screw $h$, carrying toothed wheel $i$, of the pivoted arm G, carrying pin $k$ and set-screw $m$, and the spring $p$, constructed to operate substantially as and for the purpose set forth.

3. In a millstone-dressing machine, the combination, with the frame A, of the removable weights I, substantially as and for the purpose set forth.

In testimony that I claim the above I have hereunto subscribed my name in the presence of two witnesses.

WALLACE W. CLEAVELAND.

Witnesses:
TRACY H. SOUTHWORTH,
MYRON S. O'KEEFE.